United States Patent
Endo

(10) Patent No.: US 9,193,331 B2
(45) Date of Patent: Nov. 24, 2015

(54) VEHICLE DOOR CONTROL APPARATUS AND VEHICLE DOOR CONTROL METHOD

(75) Inventor: Jun Endo, Kanagawa (JP)

(73) Assignee: ALPHA CORPORATION, Yokohama-shi, Kanagawa (JP)

( * ) Notice: Subject to any disclaimer, the term of this patent is extended or adjusted under 35 U.S.C. 154(b) by 34 days.

(21) Appl. No.: 13/825,127

(22) PCT Filed: Feb. 7, 2012

(86) PCT No.: PCT/JP2012/052770
§ 371 (c)(1),
(2), (4) Date: Mar. 20, 2013

(87) PCT Pub. No.: WO2012/108440
PCT Pub. Date: Aug. 16, 2012

(65) Prior Publication Data
US 2013/0169408 A1 Jul. 4, 2013

(30) Foreign Application Priority Data
Feb. 7, 2011 (JP) ................................ 2011-023689

(51) Int. Cl.
*B60R 25/01* (2013.01)
*B60R 25/20* (2013.01)
*G07C 9/00* (2006.01)
*E05F 15/73* (2015.01)
(Continued)

(52) U.S. Cl.
CPC .............. *B60R 25/01* (2013.01); *B60R 25/2045* (2013.01); *E05F 15/73* (2015.01); *E05F 15/77* (2015.01); *G07C 9/00309* (2013.01); *E05F 15/79* (2015.01); *E05Y 2400/326* (2013.01); *E05Y 2600/46* (2013.01); *E05Y 2900/546* (2013.01); *G07C 2209/63* (2013.01); *G07C 2209/64* (2013.01)

(58) Field of Classification Search
CPC . B60R 25/2045; B60R 25/01; E05F 15/2203; E05F 15/2076; E05F 15/2092; E05Y 2400/326; E05Y 2900/546; E05Y 2600/46
USPC ........ 340/5.61, 5.72, 426.16, 426.17, 426.22, 340/426.23, 426.24, 426.28, 426.29, 426.36
See application file for complete search history.

(56) References Cited

U.S. PATENT DOCUMENTS 6,034,617 A * 3/2000 Luebke et al. ............... 340/5.62
6,236,333 B1 * 5/2001 King ............................ 340/5.61
(Continued)

FOREIGN PATENT DOCUMENTS

CN 101127134 A 2/2008
CN 101135209 A 3/2008
(Continued)

*Primary Examiner* — Nabil Syed
(74) *Attorney, Agent, or Firm* — Drinker Biddle & Reath LLP

(57) ABSTRACT

A vehicle door control apparatus is provided with an authentication unit, a detection unit and a control unit. The authentication unit authenticates an ID information outputted from a mobile device carried by a user. The detection unit detects an object around a door. The control unit performs an opening operation of the door at least when both a first condition and a second condition are satisfied. In the first condition, the authentication unit authenticates the ID information. In the second condition, the detection unit detects that the object is separated from a predetermined determination area after the object is continuously located in the determination area over a predetermined time.

13 Claims, 4 Drawing Sheets

(51) Int. Cl.
  *E05F 15/77* (2015.01)
  *E05F 15/79* (2015.01)

(56) References Cited

U.S. PATENT DOCUMENTS

| | | | |
|---|---|---|---|
| 6,724,322 B2 * | 4/2004 | Tang et al. | 340/989 |
| 7,193,509 B2 * | 3/2007 | Bartels et al. | 340/436 |
| 2001/0054952 A1 * | 12/2001 | Desai et al. | 340/5.72 |
| 2005/0280518 A1 | 12/2005 | Bartels et al. | |
| 2007/0132552 A1 | 6/2007 | Kurpinski et al. | |
| 2008/0048827 A1 | 2/2008 | Nakasato et al. | |
| 2009/0224879 A1 * | 9/2009 | Nakazawa et al. | 340/5.72 |
| 2010/0039221 A1 * | 2/2010 | Lickfelt et al. | 340/5.72 |
| 2011/0057773 A1 * | 3/2011 | Newman et al. | 340/5.72 |
| 2011/0118946 A1 * | 5/2011 | Reimann et al. | 701/49 |

FOREIGN PATENT DOCUMENTS

| | | |
|---|---|---|
| JP | 2005-315024 | 11/2005 |
| JP | 2007-162459 | 6/2007 |
| JP | 2009-209659 | 9/2009 |
| JP | 2010-43525 | 2/2010 |
| WO | WO 2009132766 A1 * | 11/2009 |

* cited by examiner

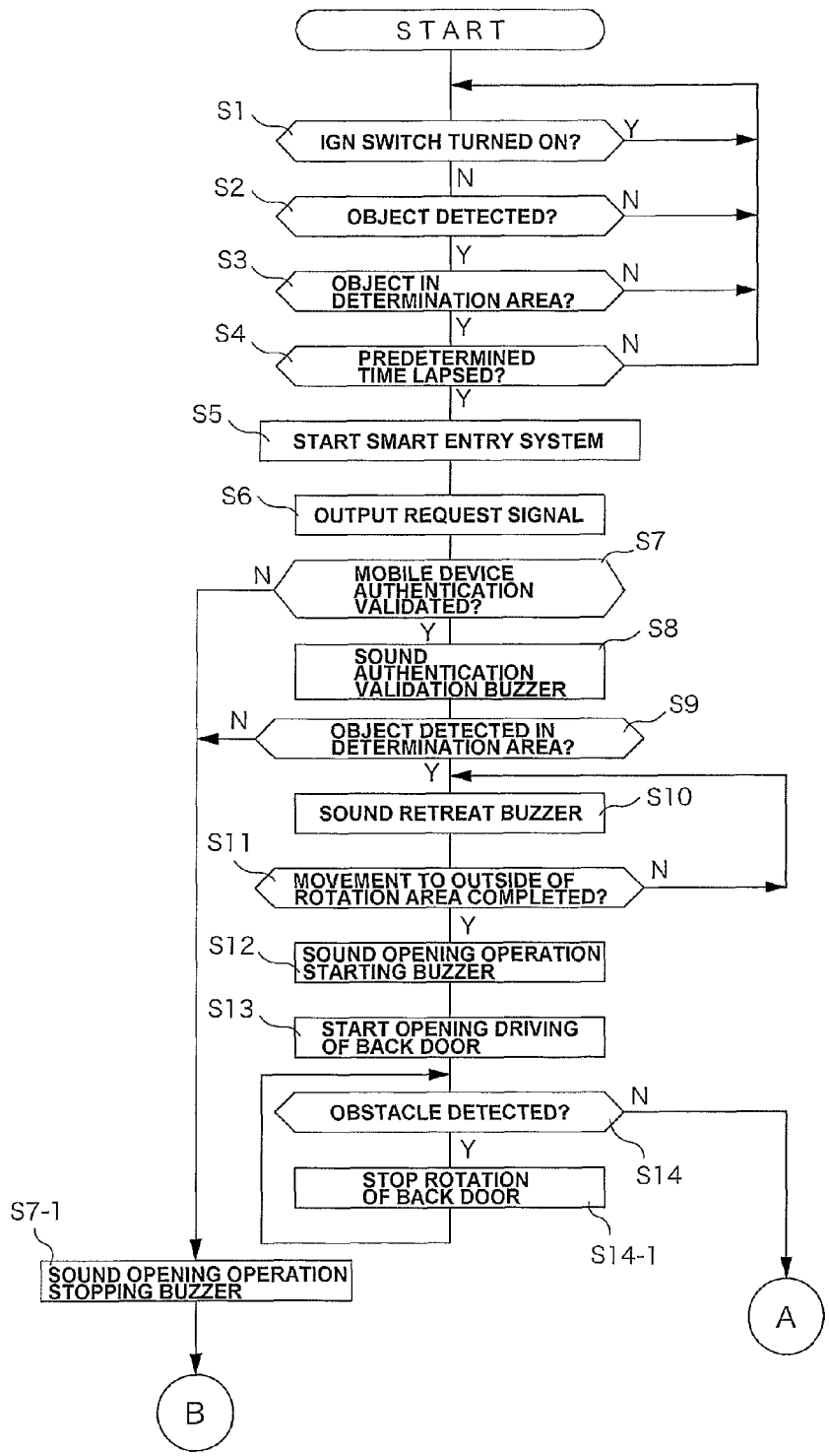

VEHICLE DOOR CONTROL APPARATUS AND VEHICLE DOOR CONTROL METHOD

TECHNICAL FIELD

The invention relates to a vehicle door control apparatus.

BACKGROUND ART

Patent Document 1 discloses a control system for controlling the opening and closing state of a vehicle door, a trunk lid, and so on. This control system is configured by a mobile device which is carried by a user and a vehicle-side unit which can mutually communicate with the mobile device.

The mobile device is provided with a registration storage unit in which an automatic opening and closing instruction for the vehicle door is registered. The vehicle door is unlocked and then the automatic opening operation thereof is performed when the vehicle-side unit receives the automatic opening and closing instruction at the time of communicating with the mobile device and the authentication for the mobile device is validated.

However, the above control system has a problem that it is necessary to register the automatic opening and closing instruction in the mobile device in advance when opening and closing the vehicle door and thus usability is poor.

PRIOR ART DOCUMENT

Patent Document

Patent Document 1: JP-A-2009-209659

SUMMARY OF INVENTION

Embodiments of the invention relate to a vehicle door control apparatus and a vehicle door control method, in which an opening and closing operation of a vehicle door can be performed without requiring a special operation to a mobile device and therefore it is possible to improve usability.

BRIEF DESCRIPTION OF DRAWINGS

FIG. 2 (*a*) is a view showing a state where a user carrying luggage enters a determination area, FIG. 2 (*b*) is a view showing a state where a door opening condition is satisfied and therefore a back door is opened, FIG. 2 (*c*) is a view showing a state where a user loads the luggage and FIG. 2 (*d*) is a view showing a state where the back door is rotationally driven up to a rotation termination position in an opening direction.

FIG. 3 is a flowchart showing an operation of the embodiment.

DESCRIPTION OF EMBODIMENTS

Hereinafter, embodiments of the invention will be described with reference to the drawings. Here, the embodiments are only examples and not intended to limit the invention. It should be noted that all features and their combinations described in embodiments are not necessarily considered as essential to the invention.

Figure 1:
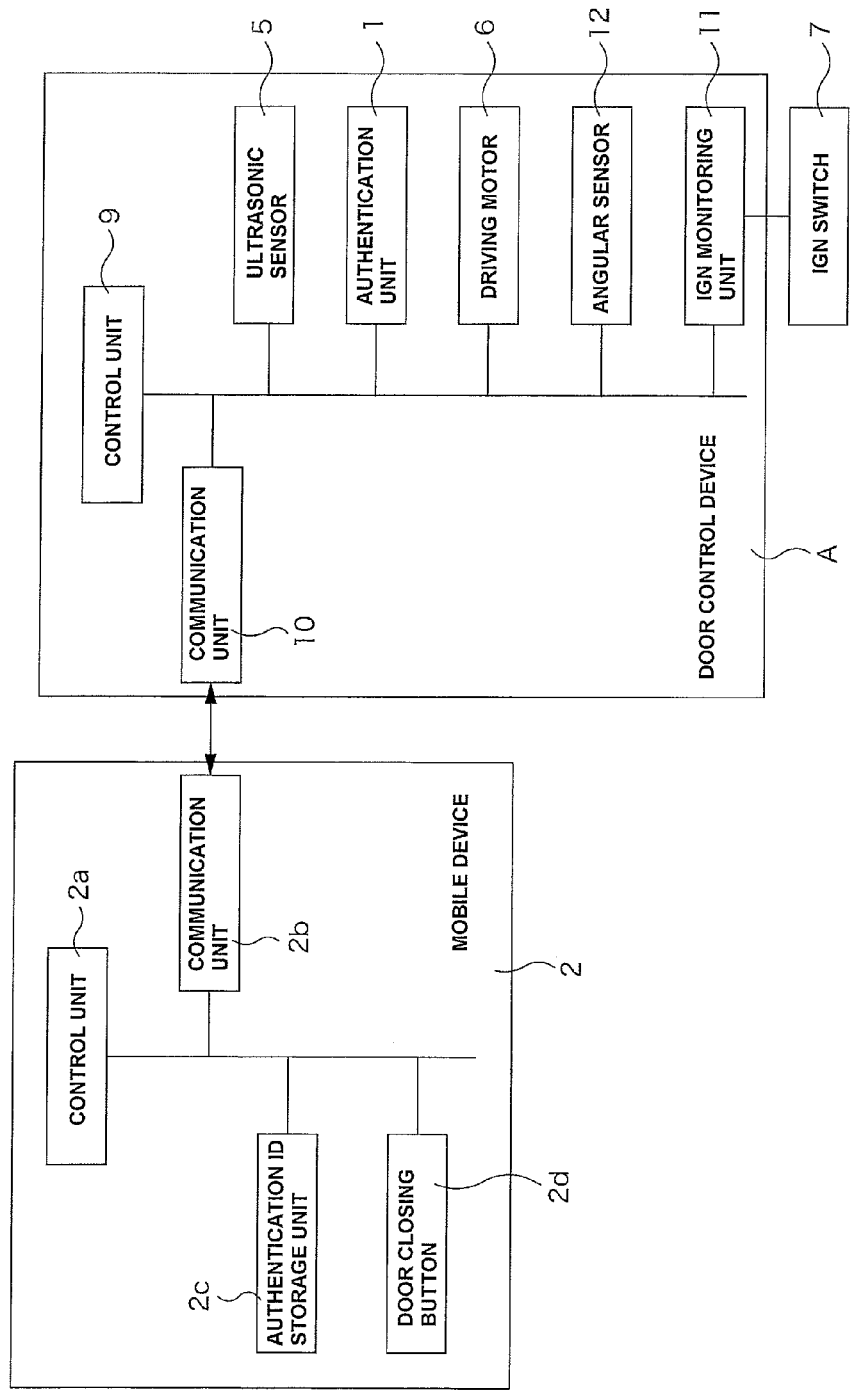
FIG. 1 is a functional block diagram showing an embodiment.

FIG. 1 shows a door control system for controlling the opening and closing of a vehicle back door (door 3).

The control system is configured by a mobile device 2 which is carried by a user of a vehicle 8 and a door control apparatus (A) which is mounted on the vehicle 8 and can mutually communicate with the mobile device 2.

The mobile device 2 includes control unit 2*a* and a communication unit 2*b* which is controlled and operated by the control unit 2*a*. When the communication unit 2*b* receives a request signal from the door control apparatus (A), the control unit 2*a* reads out an unique ID information of the mobile device 2 stored in an authentication ID storage unit 2*c*, sets the ID information to the communication unit 2*b* and outputs the ID information to the door control apparatus (A) as a response signal.

Further, the mobile device 2 is provided with a door closing button 2*d* which can be operated by a user. When the control unit 2*a* detects that the door closing button 2*d* is pressed down, the control unit 2*a* sets and outputs a door closing request signal along with the ID information to the door control apparatus (A) from the communication unit 2*b*.

The door control apparatus (A) includes a control unit 9, a communication unit 10 which is controlled and operated by the control unit 9, an authentication unit 1 and an ignition monitoring unit 11 which monitors the state of an ignition switch (operation unit 7). Furthermore, the door control apparatus (A) includes a detection unit 5, a driving motor 6 as an electric power source for rotationally driving the back door 3 and an angular sensor 12 for detecting a rotation angle of the back door 3, whose input and output are respectively controlled and monitored by the control unit 9.

Upon authentication, the authentication unit 1 first outputs a request signal to the mobile device 2 and then waits for a response signal from the mobile device 2 for the request signal. When the authentication unit receives the response signal within a predetermined time, the authentication unit 1 compares the ID information contained in the response signal with the registered ID information stored in a storage unit (not shown) and outputs an authentication validation signal when it is verified that the ID information and the registered ID information are matched to each other.

According to an embodiment, an ultrasonic sensor is utilized as the detection unit 5 and measures a distance to an obstacle (object to be detected 4) behind the back door 3. As shown in FIG. 2 (*a*), a rotation area (Ri) of the back door 3 and a determination area (R) are set in a region behind the back door 3. The determination area (R) is contained in the rotation area (Ri) and arranged close to the back door 3. From the measured values by the ultrasonic sensor 5, the control unit 9 determines whether the object 4 enters and exits the determination area (R) or moves to the outside of the rotation area (Ri).

Figure 4:
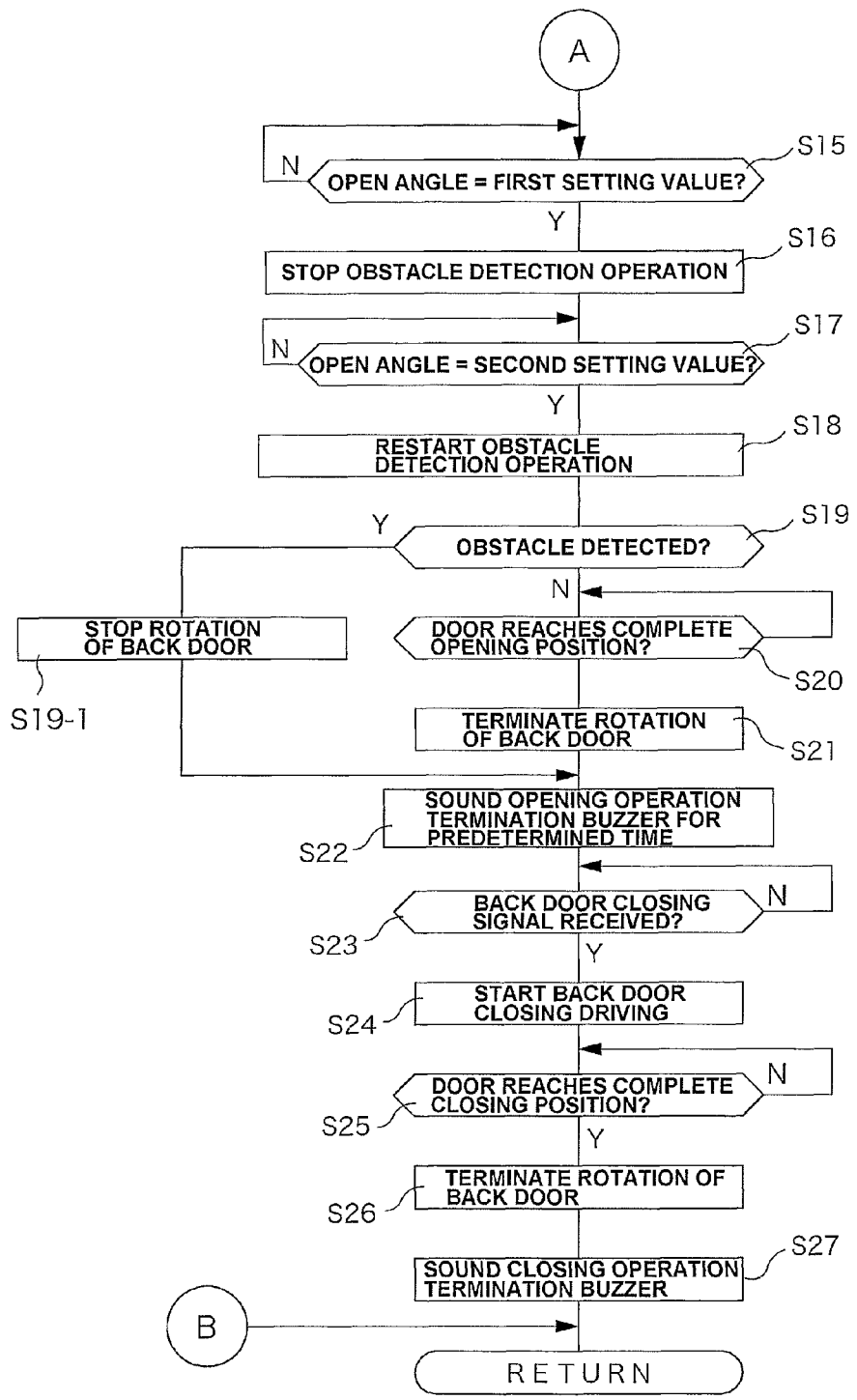
FIG. 4 is a flowchart showing an operation of the embodiment.

An operation of the door control apparatus (A) is shown in FIGS. 3 and 4. In operation, the control unit 9 of the door control apparatus (A) first checks the output of the ignition monitoring unit 11 (Step S1). When an ignition switch is in an on-state, more precisely, when the ignition switch is not in an off-state or an ACC-state, there is a possibility that the back door 3 is opened in a situation where a driver of a vehicle 8 is located in the vehicle and the vehicle 8 is in a starting state or a miming state. Accordingly, the control unit 9 does not perform the control flow and waits until the ignition switch is turned to the off-state or the ACC-state.

Meanwhile, when it is detected that the ignition switch is in the off-state or the ACC-state, the control unit 9 checks the output of the ultrasonic sensor 5 (Step S2). In this case, when the object 4 is detected, the control unit 9 determines whether the object 4 is located in the determination area (R) or not (Step S3).

Figure 2A:
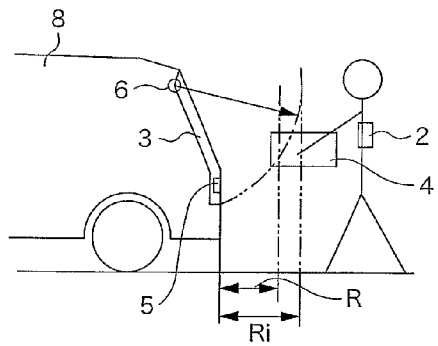
FIGS. 2 (*a*) to (*d*) are explanatory views showing an operation of the embodiment.
Figure 2B:
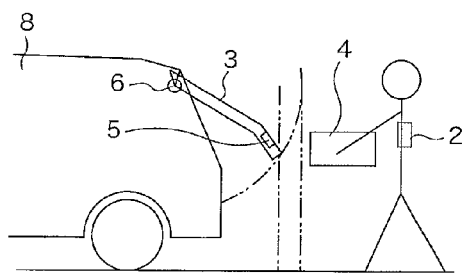
Figure 2C:
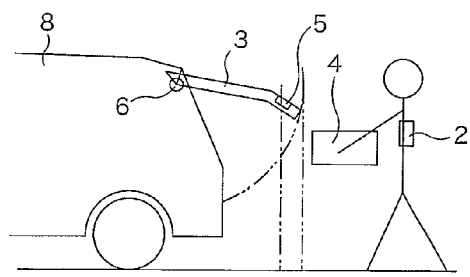
Figure 2D:
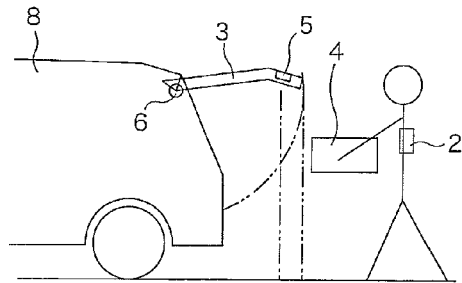

As shown in FIG. 2(a), when it is detected by the ultrasonic sensor 5 that a user carrying the object 4 approaches the determination area (R), the control unit 9 starts a timer and then measures an elapsed time (Step S4). When a predetermined time has lapsed, the control unit 9 starts a smart entry system (Step S5) and outputs a request signal from the authentication unit 1 (Step S6). When a response signal from the mobile device 2 for the request signal is received in the predetermined time and the authentication for the ID information contained in the response signal is validated (Step S7), the authentication unit 1 sounds a buzzer to inform the authentication validation (Step S8).

Meanwhile, since conditions for the opening operation are not satisfied when the authentication is not validated in Step S7, a buzzer to inform the stop of the opening operation is sounded (Step S7-1) and then the control flow returns to its initial state.

When there is a buzzer sounding by Step S8, an opportunity to stop the processing is given to a user. In a case where the user retreats from the determination area (9) within a predetermined time from the buzzer sounding and the retreat of the object 4 is detected by the ultrasonic sensor 5 (Step S9), an opening-operation-stop-buzzer is sounded (Step S7-1) and then the control flow returns to its initial state.

On the other hand, when the user remains in the determination area (R) for a predetermined time after the authentication validation buzzer sounds, the control unit 9 sounds a buzzer to cause the user to retreat from the determination area (R) (Step S10). When it is detected by the ultrasonic sensor 5 that the user retreats out of the rotation area (Ri) (as shown in FIG. 2 (b)) after the retreat buzzer is sounded (Step S11), the control unit 9 sounds an opening operation starting buzzer (Step S12) and actuates the driving motor 6 to perform the opening operation of the back door 3 (Step S13).

As rotation of the back door 3 is started, a rotation angle of the back door 3 is measured by an angular sensor 12 and detection of an obstacle 4 is performed by the ultrasonic sensor 5 fixed to the back door 3 until the rotation angle reaches a predetermined angle (Step S14). The detection of the obstacle 4 in Step S14 is performed by detecting whether the obstacle 4 is present or not in a region spaced apart from the back door 3 (more precisely, the ultrasonic sensor 5 fixed to the back door 3) by a predetermined interval. When the obstacle 4 is detected in Step S14, the control unit stops the rotation of the driving motor (Step S14-1) and then waits for the removal of the obstacle 4.

The detection of the obstacle 4 is performed until the rotation angle of the back door 3 reaches a predetermined value. When an output value of the angular sensor 12 reaches a predetermined value, for example, an open angle to substantially avoid interference of the back door 3 with the luggage to be loaded (as shown in FIG. 2 (c)) (Step S15), the control unit 9 stops the detection operation of the obstacle 4 by the ultrasonic sensor 5 (Step S16).

When the back door 3 is further rotated in this state and the angular sensor 12 detects that the rotation angle of the back door reaches a predetermined angle, that is, a rotation angle in which there is a concern of the collision of the back door with a ceiling part in the vicinity of a rotation stroke end position (Step S17), the control unit resumes the detection of the obstacle 4 by the ultrasonic sensor 5 (Step S18). When the obstacle 4 is not detected in the obstacle detection step (Step S19), the control unit 9 determines from the output of the angular sensor 12 whether the back door 3 is rotated or not to a predetermined rotation end angle (Step S20). When the rotation end is detected as shown in FIG. 2 (d), the rotation operation of the back door 3 is ended (Step S21).

The control unit 9 stops the driving motor 6 and then sounds an opening-operation-end-buzzer so as to inform a user of the rotation end (Step S22). In this way, the opening operation is ended.

On the other hand, when the obstacle 4 is detected in Step S19, it is assumed that the back door 3 approaches a ceiling surface or the like. Accordingly, the control unit considers the rotation position as a rotation end position and stops the rotation of the back door (Step S19-1). Then, the procedures after Step S22 are performed.

When the opening operation has been completed as described above, the control unit 9 waits for a door closing request signal from the mobile device 2. As the communicating unit 10 receives the door closing request signal from the mobile device 2 (Step S23), the control unit 9 reversely rotates the driving motor 6 to drive the back door 3 in a closing direction (Step S24).

The rotation driving is continued until the angular sensor 12 detects a fully closed position (Step S25, Step S26). When it is detected that the back door reaches the fully closed position, the control unit sounds a closing-operation-end-buzzer (Step S27). In this way, the control process is ended.

According to embodiments, a door control apparatus (A) may include an authentication unit 1 configured to authenticate an ID information outputted from a mobile device 2 carried by a user, a detection unit 5 configured to detect an object 4 around a door 3 to close an opening of a vehicle, and a control unit 9 configured to perform an opening operation of the door 3 at least when both a first condition and a second condition are satisfied. The first condition is defined as a condition in which the authentication unit 1 authenticates the ID information and the second condition is defined as a condition in which the detection unit 5 detects that the object 4 is located in a predetermined determination area (R) adjacent to the door 3 continuously in excess of a predetermined time and then the object 4 is separated from the determination area (R).

According to embodiments, the door control method may include a step of authenticating ID information outputted from the mobile device carried by a user, a step of detecting the object 4, which is located around the door 3 to close an opening of a vehicle and a step of performing an opening operation of the door 3 when the authentication of the ID information is validated and the object 4 is located in a predetermined determination area (R) adjacent to the door 3 continuously in excess of a predetermined time and then separated from the determination area (R).

In the embodiments, when a user approaches a door 3 such as a back door which is subjected to an opening operation, enters and remains in the determination area (R) for a predetermined time and moves out of the determination area (R), a minimum condition of the opening control is satisfied. In addition to this condition, when other conditions such as the authentication validation in the authentication unit 1 are satisfied, members relating to the opening operation are actuated to perform the opening operation of the door 3.

Accordingly, since the opening operation of the door 3 is performed by the access of a user to the determination area (R), that is, the motion of the user, it is not necessary to register the door opening operation information in the mobile device 2 for authentication in advance each time when performing the automatic opening operation and therefore usability is improved.

Further, the determination of the opening operation is performed by detection of a retreat motion of a user after remaining in the determination area (R) for a predetermined time. For example, this motion includes an access motion of a user to a vehicle when loading the luggage on a vehicle and a retreat motion of the user for avoiding the collision with the door 3 when the door 3 is opened. Accordingly, this operation is a natural motion for a user and easy to remember and there is no mental resistance. Further, the remaining time in the determination area (R) serves to check the door opening operation intention of a user. Accordingly, the opening operation can be distinguished from the mere passing by passers when the remaining time is properly set. As a result, the reliability is also improved.

The detection unit 5 may employ a distance measuring sensor using reflective waves from the object 4, such as infrared rays, ultrasonic waves. A plurality of sensors may be used for the purpose of expanding the detection range or preventing the deterioration in resolution due to the directivity. Furthermore, the detection unit 5 may employ a distance measuring device using an image processing or a device using a response signal from the mobile device 2. In the latter case, a distance measuring technique may be used in which the strength of communication radio waves outputted from the mobile device 2 is indicated by RSSI (Received Signal Strength Indication), for example.

The door 3 whose opening operation is controlled may be a door to close a side opening of a vehicle, a back door to close a rear opening thereof and further a trunk lid to close a trunk thereof.

The opening operation may include not only a first drive in which the door is forcibly driven to an opening stroke end using the electric power source 6 such as a motor but also a second drive in which the door 3 can be projected from a side surface of a vehicle body in a size appropriate to the extent to give a knob to a user. In the second drive, the control of the opening operation is performed by controlling a releasing operation of a locking mechanism which holds a closing state of the door 3 that is urged in a door opening direction by a suitable urging member. On the contrary, the control in the first drive is performed by the control of the electric power source 6 or the control of a locking mechanism and an electric power.

Further, according to the embodiment, in the door control apparatus (A) and the door control method, the predetermined determination area (R) may be set in an area belonging to the rotation area (Ri) of the door 3.

When the predetermined determination area (R) is set in the area belonging to the rotation area (Ri) of the door 3, the opening operation of the door is performed in a situation where the object 4 is moved in an area which does not hinder the opening operation of the door. Accordingly, it is possible to securely prevent the damage of the back door due to the contact with the luggage during the opening operation or the breakage of the luggage.

In this case, although the determination area (R) and the rotation area may be matched to each other by setting an entire rotation area as the determination area (R), it is desirable to set a portion of the rotation area close to the door 3 as the determination area (R). With this configuration, a buffer zone is provided between the determination area (R) and the rotation area and therefore it is possible to prevent the degradation of the detection accuracy due to the movement of the object 4 in an interface position therebetween.

According to embodiments, the door control apparatus (A) may further include the driving motor 6 to drive the door 3. The detection unit 5 may be fixed to the door 3. The retreat of the object 4 from the determination area (R) after being located in the determination area (R) continuously in excess of predetermined time may be detected in a state where the door 3 is closed. The control unit 9 may stop the driving of the driving motor 6 when the detection unit 5 detects that the object 4 approaches the door 3 at a predetermined interval during the opening operation of the door.

Further, the door control method may include a step of performing the opening operation of the door 3 by an electric power source and a step of stopping the driving of the electric power source when it is detected that the object 4 approaches the door 3 at a predetermined interval during the opening operation of the door. The retreat of the object 4 from the determination area (R) after being located in the determination area (R) continuously in excess of predetermined time may be detected in a state where the door 3 is closed.

According to embodiments, the start of the opening operation is performed by detecting a predetermined remaining time in the determination area (R) and the retreat from the determination area. When the door opening operation is started, the door opening operation proceeds while performing the detection of the obstacle by the detection unit 5 fixed to the door 3.

The detection unit 5 may be fixed not only at least to the door 3 but also to a vehicle body and therefore it is possible to improve the detection accuracy.

According to embodiments, the driving of the electric power source 6 is controlled on the basis of the distance between the door 3 and the object 4 and the electric power source 6 is stopped when an obstacle enters a rotation range of the door 3 during operation. As a result, it is possible to reliably prevent collision of the door 3 and the luggage or the like during the door opening operation.

Further, according to embodiments, in the door control apparatus (A), the control unit 9 may output a signal to cause a user to be separated from the determination area (R) when the detection unit 5 detects that the object 4 is located in the determination area (R) continuously in excess of a predetermined time.

Further, the door control method may include a step of outputting a signal to cause a user to be separated from the determination area (R) when it is detected that the object 4 is located in the determination area (R) continuously in excess of a predetermined time.

With this configuration, it is possible to inform a user of the remaining time in the determination area (R) and therefore usability is improved.

Further, according to embodiments, in the door control apparatus (A), the authentication unit 1 may start an authentication operation when the detection unit 5 detects that the object 4 is located in the determination area (R) in excess of a predetermined time.

Further, the door control method may include a step of performing the authentication of the ID information when it is detected that the object 4 is located in the determination area (R) in excess of a predetermined time.

That is, in case of a so-called smart entry system in which the use rights of a user is authenticated by performing authentication for the mobile device 2 carried by the user, an authenticating operation for the mobile device 2 is generally performed in this order of outputting a request signal from a vehicle side to the mobile device 2 and then authenticating a response signal from the mobile device for the request signal by the authentication unit 1 on the vehicle side.

In this case, as described above, since the authentication unit 1 is configured to start operation when the detection unit detects that the object 4 remains in the determination area (R) in excess of a predetermined time, there is no case that the request signal is outputted, as long as the opening operation intention of a user is not confirmed. Accordingly, this configuration attributes to power saving. In addition, it is not necessary to perform a request signal output operation which is difficult to perform in a case where a user touches a handle or carries a luggage, etc., and therefore usability becomes better.

Further, according to embodiments, in the door control apparatus (A), the authentication unit 1 may include a signal generating unit for outputting a signal to inform a user of the authentication validation and the control unit 9 may terminate the operation without having to start the opening operation of the door 3 when the detection unit 5 detects that the object 4 is separated from the determination area (R) within a predetermined time after the authentication validation signal is outputted by the authentication unit 1.

Further, the door control method may include a step of outputting a signal to inform a user of the authentication validation and a step of terminating the operation without having to start the opening operation of the door 3 when it is detected that the object 4 is separated from the determination area (R) within a predetermined time after the authentication validation signal is outputted.

By employing such a configuration, the stop of the operation becomes easier.

According to embodiments, in the door control apparatus (A), the control unit 9 may perform the opening operation of the door 3 when a third condition in which the operation unit 7 during the vehicle operation is in a predetermined state is satisfied, in addition to the first condition and the second condition.

Further, the door control method may include a step of performing the opening operation of the door 3 when an additional condition in which the operation unit 7 during the vehicle operation is in a predetermined state is satisfied.

The control unit 9 monitors the states of the operation unit 7 such as an ignition switch to be operated when driving the vehicle or a shift lever and the eligibility of the opening operation of the door 3 or a door opening operation intention is determined from these states. By adding the states of the operation unit 7 to be operated during driving as a condition of the opening operation, it is possible to control the opening operation by operation of a driver to the operation unit 7 and therefore it is possible to reliably prevent malfunction.

In this case, for example, when the above-described configuration is applied to a state which is not directly related to starting or running of a vehicle, such as when the ignition switch is in an OFF-position or an ACC-position or when the shift lever is in a "parking" position, it is possible to prevent an inadvertent opening operation of the door 3 during the starting or running of a vehicle and therefore it is possible to enhance safety.

According to embodiments, since the opening and closing operation of a vehicle door can be performed without requiring a special operation to a mobile device, it is possible to improve usability.

DESCRIPTION OF REFERENCE NUMERALS

1 AUTHENTICATION UNIT
2 MOBILE DEVICE
3 DOOR
4 OBJECT TO BE DETECTED
5 DETECTION UNIT
6 ELECTRIC POWER SOURCE
7 OPERATION UNIT
R DETERMINATION AREA

The invention claimed is:

1. A vehicle door control apparatus comprising:
    an authentication unit configured to authenticate an ID information outputted from a mobile device carried by a user;
    a detection unit configured to detect an object located in a predetermined determination area adjacent to a door of a vehicle; and
    a control unit configured to perform the following operations:
        (1) determining that the object has been continuously located in the determination area over a first predetermined time duration;
        (2) determining that the ID information has been authenticated;
        (3) determining that the object has been removed from the determination area; and
        initiating an opening operation of the door when conditions at least (1)-(3) have been satisfied, wherein the control unit outputs a signal to instruct the user to remove the object from the determination area when the detection unit detects that the object has been continuously located in the determination area continuously over the first predetermined time duration.

2. The vehicle door control apparatus according to claim 1, wherein the determination area is set in an area belonging to a rotation area of the door.

3. The vehicle door control apparatus according to claim 1, further comprising:
    a driving motor that drives the door,
    wherein the detection unit is fixed to the door, and
    wherein the control unit stops a driving of the driving motor when the detection unit detects that the object approaches the door at a predetermined interval during the opening operation of the door.

4. The vehicle door control apparatus according to claim 1, wherein the authentication unit is configured to start an authentication operation when the detection unit detects that the object has been located in the determination area over the first predetermined time duration.

5. The vehicle door control apparatus according to claim 4, wherein the authentication unit further comprises a signal generating unit that outputs a signal to inform the user of an authentication validation, and
    wherein the control unit does not initiate the opening operation when the detection unit detects that the object is separated from the determination area within a second predetermined time after the authentication validation signal is outputted by the authentication unit.

6. The vehicle door control apparatus according to claim 1, wherein the control unit performs the opening operation of the door when a further condition (4) is satisfied, in addition to conditions (1)-(3),
    wherein the further condition comprises
    (4) determining that an operation unit of the vehicle is in a predetermined state.

7. A vehicle door control apparatus comprising:
    an authentication unit configured to authenticate an ID information outputted from a mobile device carried by a user;
    a detection unit configured to detect a location of an object located adjacent to a door of a vehicle; and
    a control unit configured to perform the following operations,
        (1) determining that the object has been continuously located in a first determination area over a first predetermined time duration;

(2) determining that the ID information has been authenticated;

(3) determining that the object has been removed from the first determination area and is located in a second determination area that is farther away from the door than the first determination area, after the step of (1) determining has been performed; and (4) instructing an opening of the door after the step (3) determining has been performed, wherein the first determination area is set in an area belonging to a rotation area of the door.

8. The vehicle door control apparatus according to claim 7, further comprising:

a driving motor that drives the door, wherein the detection unit is fixed to the door, and wherein the control unit stops a driving of the driving motor when the detection unit detects that the object approaches the door at a predetermined interval during the opening operation of the door.

9. The vehicle door control apparatus according to claim 7, wherein the control unit outputs a signal to instruct the user to remove the object from the first determination area when step (1) of determining and step (2) of determining have been performed by the control unit.

10. The vehicle door control apparatus according to claim 7, wherein the authentication unit is configured to start an authentication operation when step (1) of determining has been performed by the control unit.

11. The vehicle door control apparatus according to claim 10, wherein the authentication unit further comprises a signal generating unit that outputs a signal to inform the user of an authentication validation, and wherein the control unit does not initiate the opening operation when the detection unit detects that the object is separated from the determination area within a second predetermined time after the authentication validation signal is outputted by the authentication unit.

12. The vehicle door control apparatus according to claim 7, wherein the control unit performs the step of (4) instructing the opening the door only after a step of (5) determining that an operation of the vehicle is in a predetermined state is performed.

13. The vehicle door control apparatus according to claim 7, the control unit further configured to perform the operation:

(6) detecting whether the object approaches the door while the door is being opened, and (7) instructing a closing of the door when the step of (6) detecting has determined that the object approaches the door.

\* \* \* \* \*